Jan. 24, 1956    C. PETERSEN    2,731,932
WELDING CLAMP
Filed Sept. 24, 1952
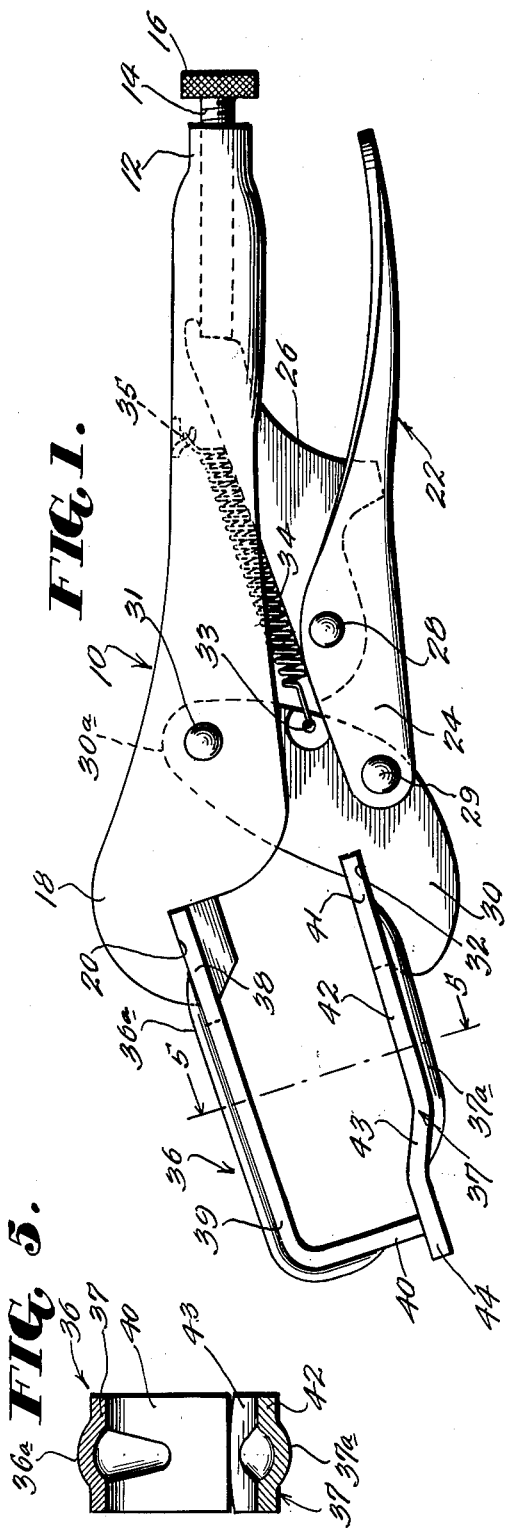
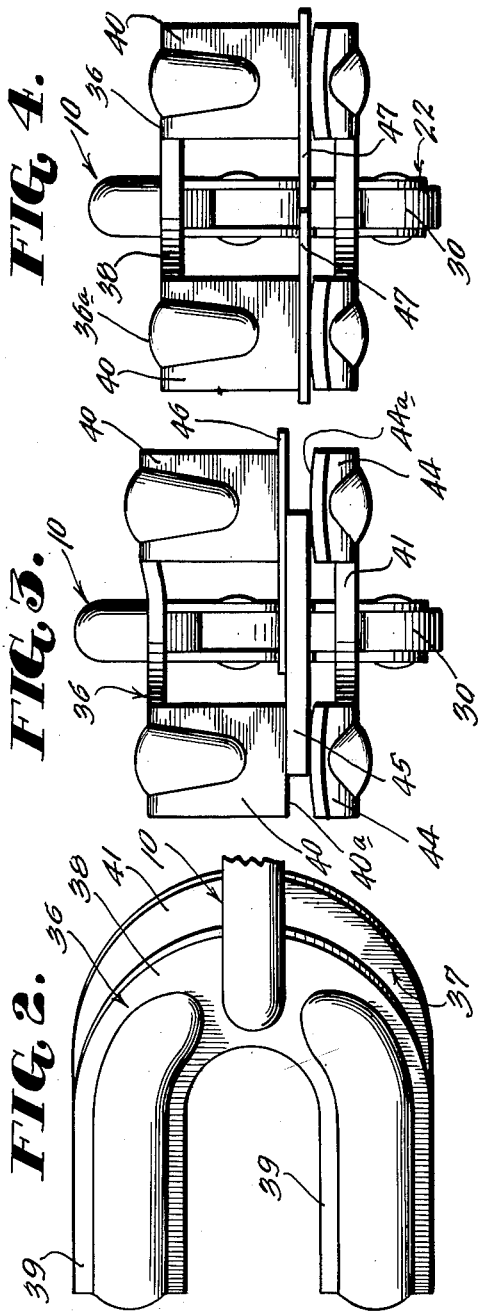
Inventor
*Christian Petersen*
By Wilfred E. Lawson
Attorney

United States Patent Office 2,731,932
Patented Jan. 24, 1956

2,731,932
WELDING CLAMP

Christian Petersen, De Witt, Nebr., assignor to Petersen Mfg. Co., Inc., De Witt, Nebr., a corporation of Nebraska Application September 24, 1952, Serial No. 311,233

1 Claim. (Cl. 113—99)

This invention relates generally to the class of tools and is directed particularly to a clamping tool designed particularly for facilitating welding operations.

A particular object of the present invention is to provide a gripping or clamping tool by means of which two pieces of metal or a cracked or torn piece of sheet metal can be firmly gripped and held either in edge to edge relation or in overlapping relation in such manner as to facilitate the welding together of the overlapped or butted edges.

While the present tool is adaptable to many uses, a particular use to which it may be put, and for which it has been designed, is for holding a cracked vehicle fender with the edges of the crack in proper opposed relation to facilitate the welding together thereof.

Still another object of the invention is to provide in a clamping or gripping tool of the character stated, a novel jaw construction, wherein are provided two spaced supporting surfaces constituting portions of one jaw, opposed by spaced finger members constituting portions of the other jaw and wherein the said portions of each jaw are designed so that objects of unequal thickness can be secured one against or upon the other due to resiliency of the coacting parts.

Other objects and advantages of the invention will become apparent as the description of the same proceeds and the invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawing:

Figure 1 is a view in side elevation of a clamping tool constructed in accordance with the present invention.

Figure 2 is a view in top plan of the forward or working end of the tool.

Figure 3 is a view in front elevation of the tool showing the coaction of the parts of the upper and lower jaws in holding objects of unequal thicknesses.

Figure 4 is a view similar to Figure 3, but showing the manner of securing together two flat bodies in edge opposed relation for the purpose of welding the same together.

Figure 5 is a sectional view taken substantially on the line 5—5 of Figure 1 through the coacting upper and lower members on one side only of the jaws.

Referring now more particularly to the drawings, the numeral 10 generally designates the elongate channeled handle of the tool, the outer end of which is closed to form the longitudinally extending sleeve 12, which is internally screw threaded to receive the threaded shank 14 of an adjustment screw 16.

At its forward end the handle 10 has the obliquely directed head portion 18 which is undercut at 20 for the purpose hereinafter stated.

The numeral 22 generally designates the lever handle which is of channeled form in its forward end 24 and pivotally connected with the lever 22 adjacent to the forward end is an end of a toggle link 26, which extends into the channeled portion 24 and is supported for rocking movement on a transverse pivot pin 28.

The rear end portion of this toggle link extends into the channeled handle 10 as shown and is engaged against the forward end of the screw shank 14.

At the forward end of the portion 24 of the lever is a pivot pin 29 which extends across between the two sides of the lever and interposed between the two sides of the forward end of the lever is the back edge of an elongate fulcrum arm 30 which has an end portion 30a positioned in the channel of the handle 10 at the rear of the head 18, where it is pivotally secured upon a transverse pivot pin 31 which extends across the channel of the handle 10 as shown.

The forward upper edge of the arm 30 is formed to provide a shoulder 32 which is directed toward or in opposed relation to the shoulder 20.

Between the pivots 29 and 31 the back edge of the arm 30 has attached thereto as at 33 an end of a pull spring 34, the opposite end of which spring is secured within the channel handle 10 at a substantial distance rearwardly of the pivot pin 31 as indicated at 35.

The action of the parts of the tool thus far described is believed to be well known and accordingly it is not believed that further description of the operation of the tool for the purpose of moving the shoulders 20 and 32 toward and away from one another is necessary to an understanding of the operation of the invention.

The clamping tool comprises two jaw units including an upper jaw unit which is generally designated 36, and a lower jaw unit which is generally designated 37.

As shown in Figure 2, the upper jaw unit is substantially U-shaped and comprises the rear or yoke portion 38 and the spaced parallel forwardly extending leg portions 39.

Each of the leg portions 39 terminates in a right angular downwardly extending finger 40 which has a broad straight pressure face 40a.

The yoke portion 38 of the upper jaw 36 is fitted centrally against the shoulder 20 of the handle head 18 to which it is welded as shown so that the jaw extends forwardly and at a slight downward inclination from the head 18 when the tool handle is held substantially horizontal.

The lower jaw 37 is also U-shaped as shown, like the jaw 36, and comprises the rear yoke portion 41 and the two forwardly extending arms 42. Each of these arms 42 is parallel with an arm 39 of the top jaw and each of the arms 42 at its forward end is angled upwardly slightly as indicated at 43 and then extended straight forwardly in the terminal portion 44 which is parallel with the part of the arm rearwardly of the angle 43. Each of the terminal parts 44 presents an upwardly facing anvil surface 44a which is opposed to the pressure face 40a of the finger 40, which pressure face contacts the anvil surface slightly rearwardly of the forward end of the part 44 as is shown in Figure 1.

The legs 39 of the upper jaw 36 and a portion of each finger 40, have the outpressed rib 36a which somewhat stiffens the legs to prevent bending of the same and the side portions or legs 42 of the lower jaw are also ribbed as indicated at 37a, for the same purpose, the ribs terminating short of the anvil forming terminals 44. However, such stiffening of the legs of the two jaw units is not carried across the yoke portion of either jaw unit so as to prevent a desired slight flexing of the legs of the jaws which permits the jaws to grip at the outer ends of the leg portions, objects of unequal thicknesses as shown in Figure 3.

As is clearly shown in Figure 3, the jaws have gripped between the anvil surfaces 44a of the lower jaw and the pressure faces 40a of the terminal portions 40 of the upper jaws, two overlapping plate members 45 and 46 of dissimilar thicknesses, the left hand upper jaw finger 40 and lower jaw terminal portion 44 gripping only the thick plate 45, while the right hand finger 40 and terminal portion 44 have between them the combined thicknesses of the plates 45 and 46 and accordingly are more widely separated. However, due to the flexibility of the legs of the jaws the two thicknesses are gripped with adequate pressure so that the plates are held firmly one upon the other and may be readily welded together along the line lying between the legs of the upper jaw unit.

In Figure 4 are shown two plates 47 of the same thickness which are held in position with their edges in opposed relation so that such edges may be readily welded by working the welding flame between the legs of the jaws, as will be readily apparent.

From the foregoing it will be seen that there is provided by the present invention a novel clamping or gripping tool whereby, upon setting the screw 16 to the proper position as is required in connection with the use of a toggle gripping tool of the character shown, the coacting parts of the jaws can be brought together upon the work material and the tool locked to hold such material firmly in place while a desired operation is being performed thereon.

By positioning the ends of the fingers 40 to strike the anvil surfaces 44a rearwardly of the forward ends thereof, it will be seen that flat work can be easily held by the tool without tipping as might occur if the ends of the fingers contacted the opposing faces of the portions 44 directly at the forward ends thereof. Thus the stability of the tool is assured when applied to any piece of work.

As is clearly illustrated in Figures 3 and 4, the terminal portions 44 have the anvil surfaces 44a thereof slightly arched in the transverse direction. By this construction the anvil will always tend to put the pressure somewhat near the center of the opposing face 40a. Also, if the clamp is used to hold a slightly tapered piece it will still, because of the curve of the anvil, tend to apply the pressure somewhat near the center of the opposed face 40a.

I claim:

In a welding clamp a pair of pivotally related members, a pair of substantially U-shaped jaw elements formed from flat resilient metallic material and secured at the yoke portions thereof to each of said members with the leg portions of said jaw elements extending forwardly from said members in substantially flat opposed relationship, flat extensions at the free ends of the leg portions of the lower of said jaw elements and downwardly extending portions at the free ends of the legs of the upper of said jaw elements in substantial alignment with said flat extensions for clamping engagement with work supported on said extensions and integral strengthening ribs formed in the legs of each jaw element, said ribs terminating short of said yoke portions to render said legs relatively rigid but permitting independent flexing thereof in each yoke portion whereby at least two work pieces of different thicknesses may be clamped between said downwardly extending portions and said free extensions.

References Cited in the file of this patent

UNITED STATES PATENTS

| | | |
|---|---|---|
| 170,344 | Caswell | Nov. 23, 1875 |
| 1,093,552 | Ebaugh | Apr. 14, 1914 |
| 1,426,026 | Webster | Aug. 15, 1922 |
| 1,781,419 | Wallace | Nov. 11, 1930 |
| 1,900,314 | Strom | Mar. 7, 1933 |
| 2,280,005 | Petersen | Apr. 14, 1942 |
| 2,521,086 | Patterson | Sept. 5, 1950 |